US011277835B2

(12) United States Patent
Zou et al.

(10) Patent No.: US 11,277,835 B2
(45) Date of Patent: Mar. 15, 2022

(54) TECHNIQUE FOR GRANT-FREE TRANSMISSIONS (71) Applicant: Telefonaktiebolaget LM Ericsson (publ), Stockholm (SE)

(72) Inventors: Zhenhua Zou, Solna (SE); Torsten Dudda, Aachen (DE); Laetitia Falconetti, Järfälla (SE); Gustav Wikström, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/605,536

(22) PCT Filed: May 4, 2018

(86) PCT No.: PCT/EP2018/061627
§ 371 (c)(1),
(2) Date: Oct. 16, 2019

(87) PCT Pub. No.: WO2018/202906
PCT Pub. Date: Aug. 11, 2018

(65) Prior Publication Data
US 2020/0128537 A1 Apr. 23, 2020

Related U.S. Application Data (60) Provisional application No. 62/502,321, filed on May 5, 2017.

(51) Int. Cl.
*H04W 72/04* (2009.01)
*H04L 1/18* (2006.01)

(52) U.S. Cl.
CPC ....... *H04W 72/0446* (2013.01); *H04L 1/1812* (2013.01); *H04L 1/1887* (2013.01)

(58) Field of Classification Search
CPC . H04L 1/1812; H04L 1/1887; H04W 72/0446
See application file for complete search history.

(56) References Cited

U.S. PATENT DOCUMENTS 7,471,693 B2 * 12/2008 Petrovic ............... H04L 1/0083
370/322
7,631,247 B2 * 12/2009 Petrovic ............... H04L 1/1887
370/444

(Continued)

OTHER PUBLICATIONS

Research in Motion, Ltd., "Number of Reserved HARQ Processes for DL SPS and Related Signalling Aspects", TSG-RAN WG2 #64, Prague, Czech Republic, Nov. 10, 2008, pp. 1-3, R2-086558, 3GPP.

(Continued)

*Primary Examiner* — Rasheed Gidado
(74) *Attorney, Agent, or Firm* — Christopher & Weisberg, P.A.

(57) ABSTRACT

The invention refers to a method (200) of handling hybrid automatic repeat request (HARQ), processes for grant-free transmission in a radio access network (RAN), the method comprising the steps of computing (202), for a radio device configured or configurable for grant-free transmission in the RAN, a number of HARQ processes for the grant-free transmission of the radio device; and signaling (204), to the radio device, the computed number of HARQ processes. The invention further refers to corresponding devices, and a corresponding computer program.

18 Claims, 5 Drawing Sheets

(56) References Cited

U.S. PATENT DOCUMENTS

| | | | |
|---|---|---|---|
| 8,296,616 B2* | 10/2012 | Wu | H04L 1/1822 |
| | | | 714/748 |
| 9,930,684 B2* | 3/2018 | Hwang | H04W 8/005 |
| 10,271,350 B2* | 4/2019 | Zhang | H04W 72/14 |
| 10,568,121 B2* | 2/2020 | Nikopour | H04W 72/1273 |
| 10,680,758 B2* | 6/2020 | Bae | H04L 1/189 |
| 2018/0049229 A1* | 2/2018 | Dinan | H04L 1/1896 |
| 2018/0199359 A1* | 7/2018 | Cao | H04L 5/0094 |
| 2019/0230691 A1* | 7/2019 | Cao | H04L 5/0044 |
| 2019/0386780 A1* | 12/2019 | Zou | H04L 1/1877 |

OTHER PUBLICATIONS

3rd Generation Partnership Project, "3rd Generation Partnership Project; Technical Specification Group Radio Access Network; Evolved Universal Terrestrial Radio Access (E-UTRA); Medium Access Control (MAC) Protocol Specification (Release 14)", Technical Specification, 3GPP TS 36.321 V14.2.1, Mar. 1, 2017, pp. 1-106, 3GPP.

ZTE, "Scheduling of V2V SPS Resources", 3GPP TSG-RAN WG1 Meeting #86, Gothenburg, Sweden, Aug. 22, 2016, pp. 1-4, R1-166981, 3GPP.

Ericsson, "TDD UL SPS Configuration", 3GPP TSG-RAN WG2 #94, Nanjing, China, May 23, 2016, pp. 1-6, R2-163795, 3GPP.

\* cited by examiner

TECHNIQUE FOR GRANT-FREE TRANSMISSIONS

TECHNICAL FIELD

The present disclosure generally relates to a technique for grant-free transmissions. More specifically, a method and a device are provided for handling hybrid automatic repeat request (HARQ) processes for grant-free transmission in a radio access network (RAN).

BACKGROUND

Instead of sending scheduling grants to a radio device for uplink (UL) transmission in individual transmission time intervals (TTIs), the RAN can configure the radio device for semi-persistent scheduling (SPS). Radio devices with activated UL SPS do not expressly indicate the process identifier (PID) of the HARQ process underlying a HARQ transmission or HARQ retransmission. Rather, the TTIs used for the HARQ transmission or HARQ retransmitting imply a certain HARQ PID.

Not expressly signaling the HARQ PID reduces the signaling overhead. However, the UE has to defer the UL transmission to the TTI associated with the correct HARQ PID even if the UE would be capable of performing the retransmission in an earlier TTI. Thus, the TTI-implied PID increases latency.

Furthermore, due to a general asynchronous HARQ feedback requirement, conventional methods of deriving the HARQ PID from the absolute system frame number (SFN) and subframe number as specified by the 3rd Generation Partnership Project (3GPP) for Long Term Evolution (LTE) in the technical specification 36.321 (e.g., in the document 3GPP TS 36.321 V14.2.1, Clause 5.4) might not work. When a UE, as a 3GPP implementation of the radio device, has a configured SPS UL grant and receives HARQ feedback at a non-specific time (as allowed in asynchronous HARQ), the HARQ retransmission may overwrite data in another HARQ process.

However, a fixed number of HARQ processes and the synchronous UL HARQ put a lower limit on the round-trip-time for the HARQ feedback and is thus inefficient for low-latency services requiring fast retransmissions. For instance, if the HARQ feedback for a certain HARQ PID is not received in a synchronous manner (e.g., at the expected TTI), the corresponding HARQ retransmission has to wait for a certain number of TTIs or subframes according to the predefine HARQ PID allocation.

SUMMARY

Accordingly, there is a need for a more efficient HARQ-protected grant-free transmission technique. More specifically, there is a need for a technique that reduces the latency of grant-free transmissions protected by HARQ. Alternatively or in addition, there is a need for a grant-free transmission technique that minimizes latency for a variety of HARQ processing capabilities.

As to one aspect, a method of handling hybrid automatic repeat request (HARQ) processes for grant-free transmission in a radio access network (RAN) is provided. The method comprises or triggers a step of computing, for a radio device configured or configurable for grant-free transmission in the RAN, a number of HARQ processes for the grant-free transmission of the radio device. The method further comprises or triggers a step of signaling, to the radio device, the computed number of HARQ processes.

At least in some embodiments, by signaling the number of HARQ process computed for the radio device to same radio device, the RAN (e.g., a base station of the RAN or a cell of the RAN) can configure the radio device (e.g., a user equipment or UE) with a radio device-specific number of configured HARQ processes for its grant-free transmission, e.g., for uplink (UL) semi-persistent scheduling (SPS).

Since the Process ID (PID) associated to a given TTI depends on the signaled number of HARQ processes (e.g., configured UL SPS processes), the HARQ timing can be tuned, e.g., to an individual HARQ processing capability of the radio device and/or a current traffic load at the cell. By way of example, different radio devices with grant-free scheduling (e.g., SPS) enabled by RRC in the same cell are signaled different number of configured UL SPS HARQ processes.

The number of configured HARQ processes may depend on the sum of the processing time for HARQ feedback at the base station and the processing time for HARQ retransmission at the UE.

The method may be implemented as a per-UE synchronized and tunable HARQ operation according to different processing capabilities at the side of the at least one radio device and at the side of the RAN, respectively, optionally along with details on how this is performed in practice. Particularly, the method may be implemented to dynamically configure the HARQ operations.

In the conventional synchronous HARQ concept of 3GPP LTE, the UE process timing is fixed to 4 TTIs, because an UL grant points to a transmission resource 4 TTIs after the UE receives the UL grant. The asynchronous HARQ feedback removes such a restriction. The UE might be able to transmit faster than 4 TTIs. The technique can be applied to minimize the overall latency. The processing timing of the UE may be known at the RAN side (e.g., at a 5G gNB or a 4G eNB) either implicitly from UE categories registered at the RAN side, or explicitly from a message sent to the RAN side.

The technique may be used as an enhancement in 3GPP LTE. Particularly, the technique may be applied in the context of UL asynchronous HARQ supporting short TTI (sTTI), so that the HARQ retransmission can be dynamically signaled by the RAN (e.g., by an eNB of the RAN). The technique is also applicable to New Radio (NR) for 5G. For example, mechanism similar to SPS UL in LTE with asynchronous HARQ are adopted for the NR under the terminology grant-free UL transmission.

The number of HARQ processes may be computed specifically for the radio device.

Signaling the computed number of HARQ processes to the radio device may configure the radio device to the signaled number of HARQ processes. The method may be implemented to synchronize grant-free UL transmissions.

The device may be identified by a radio network temporary identifier (RNTI), e.g., a cell RNTI (C-RNTI). The same physical radio device may use further HARQ processes, e.g., identified by means of another RNTI.

The grant-free transmission may be initialized, reinitialized, enabled and/or configured for the radio device, e.g., when signaling the computed number of HARQ processes. The HARQ processes may be configured for the radio device, e.g., when signaling the computed number of HARQ processes.

The grant-free transmission may be a semi-persistently scheduled transmission. In other words, the radio device configured or configurable for the grant-free transmission may be implemented by a radio device configured or configurable for semi-persistent scheduling (SPS).

The HARQ processes for the grant-free transmission of the radio device may be associated with process identifiers (PIDs). Each of the HARQ processes for the grant-free transmission of the radio device may be associated with a (e.g., unique) PID. The combination of PID and RNTI may be unique, e.g., in the RAN, in a cell of the RAN or for a base station of the RAN.

Transmission time intervals (TTIs) may be scheduled for the grant-free transmission of the radio device. The TTIs may be scheduled periodically or according to a predetermined pattern (e.g., according to a formula and/or in terms of TTIs or subframes of the RAN). Alternatively or in addition, the TTIs may be scheduled until expiry of a timer (e.g., running while the radio device is transmitting in the TTIs), and/or the TTIs may be scheduled until expiry of another timer or a counter for TTIs unused or empty transmission by the radio device.

The RAN may use or define a radio frame structure in the time domain. The radio frame structure may include subframes. Each subframe may comprise one, two or an integer multiple of TTIs. A duration of one TTI may be 1 ms or less. The TTI may be a fraction of 1 ms, e.g., a seventh of 1 subframe or of 1 ms. The TTI may comprise few modulation symbols (e.g., 2 symbols). The TTI may be referred to as a short TTI (sTTI).

The method may further comprise or trigger a step of configuring the radio device for the grant-free transmission. Configuring the radio device for the grant-free transmission may include the step of signaling the computed number of HARQ processes for the grant-free transmission of the radio device. Alternatively or in addition, configuring the radio device for the grant-free transmission may include a step of signaling, to the radio device, a RNTI for the grant-free transmission of the radio device (e.g., an SPS RNTI) and/or a scheduling period for the grant-free transmission of the radio device (e.g. an SPS interval).

The TTIs scheduled for the grant-free transmission of the radio device may be associated with the HARQ processes. Each of the TTIs scheduled for the grant-free transmission of the radio device may be uniquely associated with one of the HARQ processes configured for the radio device.

The TTIs may be associated with the HARQ processes depending on the number of HARQ processes computed for the radio device. The TTIs associated with one of the HARQ processes for the grant-free transmission of the radio device may be scheduled at a process interval. Alternatively or in addition, TTIs for the grant-free transmission of one of the HARQ processes of the radio device may be scheduled at a process interval that depends on the number of HARQ processes computed for the radio device.

The process interval at which the TTIs are scheduled for a certain one of the HARQ processes of the radio device may depend on the number of HARQ processes signaled to the radio device. For each of the HARQ processes of the radio device, the associated TTIs may be scheduled at the same process interval. The TTIs associated with one of the HARQ processes may be time-shifted relative to the TTIs associated with another one of the HARQ processes.

All TTIs for the grant-free transmission of the radio device may be scheduled at (i.e., with the periodicity of) a grant-free scheduling interval. The TTIs for the grant-free transmission of the radio device (e.g., the TTIs scheduled for any of the number of HARQ processes of the radio device and/or irrespective of the associated HARQ processes) may be scheduled at the grant-free scheduling interval. The grant-free scheduling interval may be independent of the number of HARQ processes computed for the radio device. The grant-free scheduling interval may also be referred to as a grant-free scheduling period, a grant-free transmission period, an SPS period or an SPS interval.

The process interval may be an integer multiple of the grant-free scheduling interval. The process interval may be equal to the grant-free scheduling interval multiplied by the number of HARQ processes computed for the radio device.

The process interval for the radio device may be equal to or greater than a processing time for the HARQ process. The processing time may be the time for processing a repetition or any other event of any one of the HARQ processes or a minimum round-trip-time for any one of the HARQ processes. The process interval for the radio device may be equal to or greater than a processing time for at least one of analyzing a HARQ transmission received at the RAN, preparing a HARQ feedback at the RAN and preparing a HARQ retransmission at the radio device.

The number of HARQ processes for the grant-free transmission of the radio device may be computed in accordance with $$M=\text{ceil}((i+j)/p),$$

wherein a time duration i may be equal to or greater than a processing time at the radio device for performing a HARQ retransmission, a time duration j may be equal to or greater than a processing time at the RAN for transmitting a HARQ feedback and a time duration p may be the grant-free scheduling interval. Each of the time durations may be in units of the TTI (e.g., the sTTI).

The time duration i may be configured by the RAN or indicated by the radio device. The radio device may indicate to the RAN its capability as to the time duration i. Alternatively or in addition, the time duration i may be configured by the RAN by signaling to the radio device a transmission mode or negotiating with the radio device a transmission mode. The transmission mode may be specified by a technical radio communication standard, which implies for the transmission mode a time duration i or a lower bound on the time duration i. The time j may be greater than a processing time at the RAN depending on a traffic load of the RAN.

The method may further comprise or trigger a step of receiving, from the radio device, a HARQ transmission or a HARQ retransmission in a TTI scheduled for the grant-free transmission of the radio device.

The method may further comprise or trigger a step of deriving, based on the TTI of the HARQ transmission or retransmission and the number of HARQ processes computed for the radio device, the HARQ process of the HARQ transmission or retransmission. The derivation of the HARQ process (e.g., the PID of the HARQ process) may further depend on the grant-free scheduling interval. The method may further comprise or trigger a step of routing the received HARQ transmission to the derived HARQ process.

The method may further comprise or trigger a step of deriving the HARQ process of the HARQ transmission or retransmission based on

[floor([the TTI of the HARQ transmission or retransmission]/[the grant-free scheduling interval in terms of TTIs])]modulo [the number of HARQ processes computed for the radio device].

The grant-free scheduling interval may be referred to by a variable "semiPersistSchedIntervalUL". More specifically, the grant-free scheduling interval in terms of TTIs may be represented by the variable p and/or the product semiPersistSchedIntervalUL*SPS sTTI count in subframe.

The TTI of the HARQ transmission or retransmission may be referred to by a variable "CURRENT_TTI". More specifically, the TTI of the HARQ transmission or retransmission may refer to the TTI in which the first transmission of a bundle takes place.

The number of HARQ processes computed for the radio device may be referred to by a variable "numberOfConfUISPS-Processes" or M.

The method may further comprise or trigger a step of transmitting, to the radio device, a HARQ feedback in response to the HARQ transmission or the HARQ retransmission. The HARQ feedback may be transmitted asynchronously. The HARQ feedback may be transmitted independently of the association between TTIs and HARQ processes. The HARQ feedback may be expressly indicative of the derived HARQ process (e.g., the HARQ PID).

The HARQ feedback may be indicative of a (positive) acknowledgment (ACK) or a negative acknowledgement (NACK or NAK) of the HARQ transmission or the HARQ retransmission. The NACK may trigger a (e.g., further) HARQ retransmission in the next TTI associated to the HARQ process of the HARQ retransmission.

The HARQ feedback may be transmitted the time duration i prior to a TTI associated with the HARQ process of the HARQ transmission or previous HARQ retransmission.

The technique may be implemented at the RAN. The method may be performed by a base station or a cell of the RAN. The base station may encompass any station that is configured to provide radio access to the radio device.

The one or more radio devices may receive their configuration as to the number of HARQ processes without knowing that a dedicated number of HARQ processes has been signaled by the RAN to each of the radio devices. The computed number of HARQ processes may be signaled to the radio device by means of radio resource control (RRC) signaling.

A base station or a cell of the RAN may serve a plurality of radio devices. The number of HARQ processes is at least one of computed for each of the radio devices and signaled to each of the radio devices. Different numbers of HARQ processes may be computed for different radio devices.

The radio device or each of the radio devices may be a user equipment (UE). The grant-free transmission may include at least one of an uplink transmission and a sidelink transmission.

The radio device may be configured for peer-to-peer communication (e.g., on a sidelink) and/or for accessing the RAN (e.g. an UL and/or downlink, DL). The radio device may be a user equipment (UE, e.g., a 3GPP UE), a mobile or portable station (STA, e.g. a Wi-Fi STA), a device for machine-type communication (MTC) or a combination thereof. Examples for the UE and the mobile station include a mobile phone and a tablet computer. Examples for the portable station include a laptop computer and a television set. Examples for the MTC device include robots, sensors and/or actuators, e.g., in manufacturing, automotive communication and home automation. The MTC device may be implemented in household appliances and consumer electronics. Examples for the combination include a self-driving vehicle, a door intercommunication system and an automated teller machine.

Examples for the base station may include a 3G base station or Node B, 4G base station or eNodeB, a 5G base station or gNodeB, an access point (e.g., a Wi-Fi access point) and a network controller (e.g., according to Bluetooth, ZigBee or Z-Wave).

The RAN may be implemented according to the Global System for Mobile Communications (GSM), the Universal Mobile Telecommunications System (UMTS), Long Term Evolution (LTE) and/or New Radio (NR).

The technique may be implemented on a Physical Layer (PHY), a Medium Access Control (MAC) layer, a Radio Link Control (RLC) layer and/or a Radio Resource Control (RRC) layer of a protocol stack for the radio communication.

The technique may be implemented as a technique for configuring radio devices for the HARQ processing and/or grant-free transmission.

As to another aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., via the RAN and/or via the Internet and/or by the base station. Alternatively or in addition, the method may be encoded in a Field-Programmable Gate Array (FPGA) and/or an Application-Specific Integrated Circuit (ASIC), or the functionality may be provided for download by means of a hardware description language.

As to one device aspect, a device for handling hybrid automatic repeat request (HARQ) processes for grant-free transmission in a radio access network (RAN) is provided. The device is configured to perform the method aspect. Alternatively or in addition, the device may comprise a computing unit configured to compute, for a radio device configured or configurable for grant-free transmission in the RAN, a number of HARQ processes for the grant-free transmission of the radio device. The device may further comprise a signaling unit configured to signal, to the radio device, the computed number of HARQ processes.

As to a further device aspect, a device for handling hybrid automatic repeat request (HARQ) processes for grant-free transmission in a radio access network (RAN) is provided. The device comprises at least one processor and a memory. Said memory comprises instructions executable by said at least one processor whereby the device is operative to computing, for a radio device configured or configurable for grant-free transmission in the RAN, a number of HARQ processes for the grant-free transmission of the radio device. Execution of the instructions further causes the device to be operative to signal, to the radio device, the computed number of HARQ processes.

As to a further aspect, a device for handling hybrid automatic repeat request (HARQ) processes for grant-free transmission in a radio access network (RAN) is provided. The device may comprise one or more modules for performing the method aspect. Alternatively or in addition, the device comprises a computation module for computing, for a radio device configured or configurable for grant-free transmission in the RAN, a number of HARQ processes for the grant-free transmission of the radio device. The device further comprises a signal module for signaling, to the radio device, the computed number of HARQ processes.

The device (or any node or station for embodying the technique) may further include any feature disclosed in the context of the method aspect. Particularly, any one of the units and modules, or a dedicated unit or module, may be configured to perform or trigger one or more of the steps of any one of the method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a 5G New Radio (NR) implementation, it is readily apparent that the technique described herein may also be implemented in any other radio network, including 3GPP LTE or a successor thereof, Wireless Local Area Network (WLAN) according to the standard family IEEE 802.11, Bluetooth according to the Bluetooth Special Interest Group (SIG), particularly Bluetooth Low Energy and Bluetooth broadcasting, and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
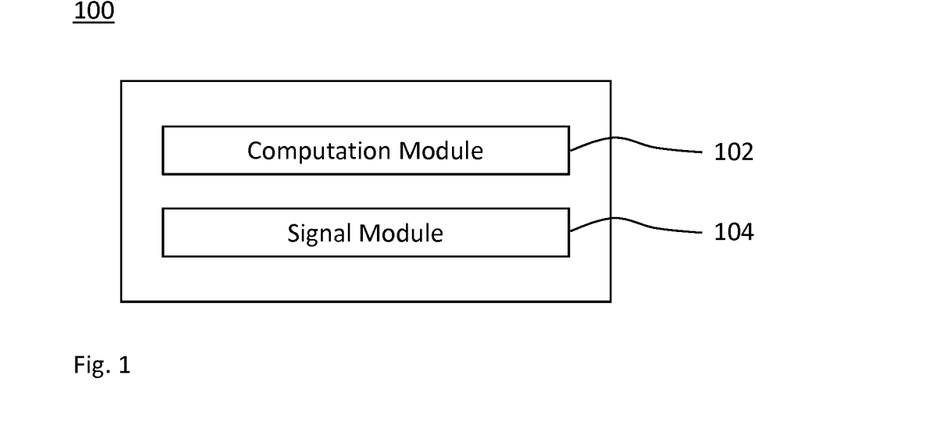
FIG. 1 shows a schematic block diagram of a device for handling HARQ processes for grant-free transmission in a RAN.

FIG. 1 schematically illustrates a block diagram of a device for handling HARQ processes for grant-free transmission in a RAN. The device is generically referred to by reference sign 100.

The device 100 comprises a computation module 102 that computes, for a radio device configured or configurable for grant-free transmission in the RAN, a number of HARQ processes for the grant-free transmission of the radio device. The device 100 further comprises a signal module 104 that signals, to the respective radio device, the computed number of HARQ processes.

The device 100 may be connected to and/or part of the RAN. The device 100 may be embodied by or at a base station of the RAN, nodes connected to the RAN for controlling the base station or a combination thereof.

Any of the modules of the device 100 may be implemented by units configured to provide the corresponding functionality.

The base station may encompass a network controller (e.g., a Wi-Fi access point) or a radio access node (e.g. a 3G Node B, a 4G eNodeB or a 5G gNodeB) of the RAN. The base station may be configured to provide radio access. Alternatively or in addition, the one or more radio devices may include a mobile or portable station or a radio device connectable to the RAN. Each radio device may be a user equipment (UE) and/or a device for machine-type communication (MTC). Two or more radio devices may be configured to wirelessly connect to each other, e.g., in an ad-hoc radio network or via 3GPP sidelinks.

Figure 2:
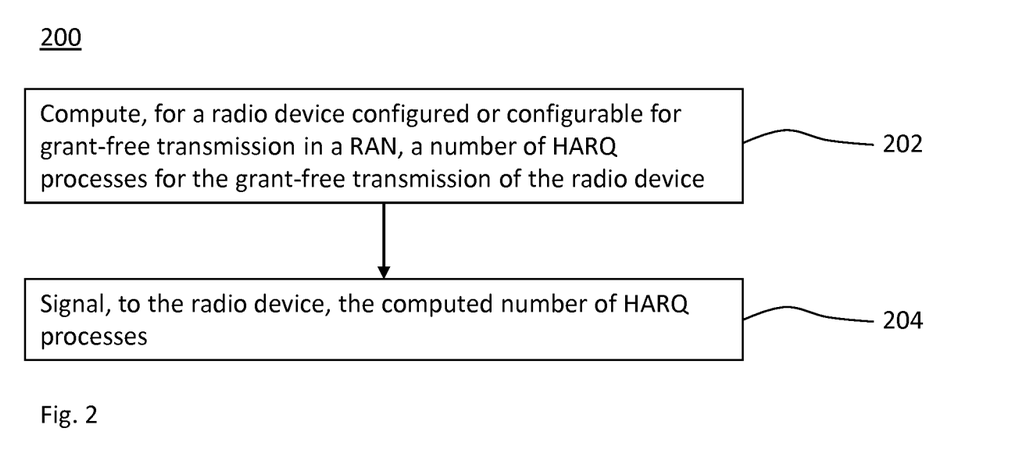
FIG. 2 shows a flowchart for a method of handling HARQ processes for grant-free transmission in a RAN, which is implementable by the device of FIG. 1.

FIG. 2 shows a flowchart for a method 200 of handling HARQ processes for grant-free transmission in a RAN. The method 200 comprises a step 202 of computing, for a radio device 100 configured or configurable for grant-free transmission in the RAN, a number of HARQ processes for the grant-free transmission of the radio device. The computed number of HARQ processes is signaled to the radio device in a step 204.

The method 200 may be performed by the device 100, e.g., at or using the base station of the RAN. For example, the modules 102 and 104 may perform the steps 202 and 204, respectively.

Embodiments of the technique maintain a per-UE synchronous HARQ feedback operation, e.g., instead of a cell-wise synchronous HARQ feedback. The technique may be implemented as a network algorithm that can fulfil the purpose of the asynchronous HARQ while maintaining the compatibility with TS 36.321.

Figure 3:
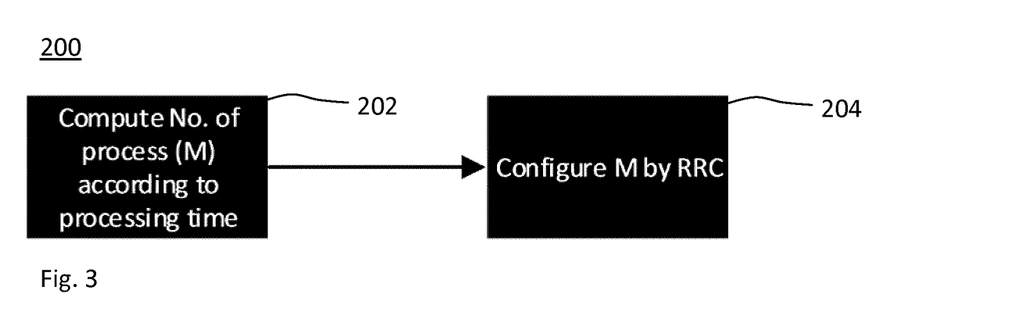
FIG. 3 shows a flowchart for a first implementation of the method of FIG. 2.

FIG. 3 shows a flowchart for a first implementation of the method 200, which is combinable with any implementation or embodiment disclosed herein.

The number of HARQ processes for a specific radio device are computed according to the time duration for processing each of the HARQ processes in the step 202. The RRC signaling used for the step 204 change the configuration of the radio device so that the RAN and the radio device apply the same association between TTIs and HARQ PIDs.

Figure 4:
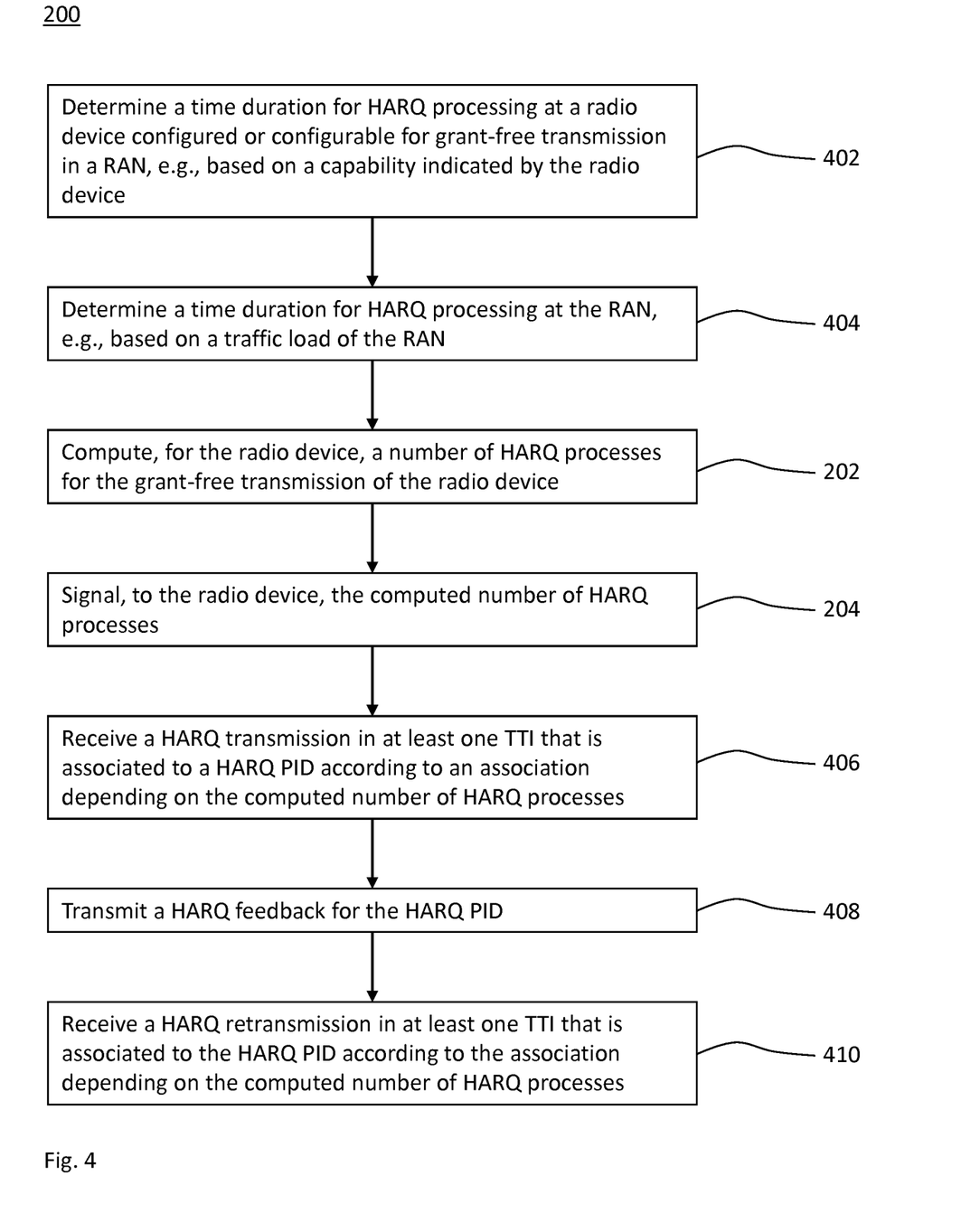
FIG. 4 shows a flowchart for a second implementation of the method of FIG. 2.

FIG. 4 shows a flowchart for a second implementation of the method 200, which is combinable with any implementation or embodiment disclosed herein.

The time between synchronous HARQ feedback is the sum of a processing time i at the UE side and a processing time j that can be chosen at the RAN, e.g., the network node performing the method 200. The network node calculates the number of processes according to the step 202 and sets the number of processes in the SPS configuration message by RRC in the step 204. Afterwards, both the network node and the UE node keep synchronized to the HARQ PID for each grant-free or configured SPS UL transmission according to a formula. The formula depends on the computed and signaled number of HARQ processes.

In a first variant, the second implementation of the method 200 may further comprises a step 402 for determining the time duration i for HARQ processing at the UE. Alternatively or in addition, the second implementation of the method 200 may further comprises a step 404 for determining the time duration j for HARQ processing at the RAN.

In a second variant, which is combinable with the first variant, the second implementation of the method 200 may further apply the UE-specific association between TTIs and PIDs configured in the steps 202 and 204 at the RAN side and the UE side, respectively. For example, the at least one TTI of a HARQ transmission in a step 406 is associated with the PID of the underlying HARQ process.

Since the TTIs in the step 406 for the HARQ transmission from the radio device and, when requested by the RAN in a step 408, for HARQ retransmission in a step 410, are indicative of the HARQ PID by virtue of the association, the HARQ feedback in the step 408 for triggering the HARQ retransmission may be transmitted in any TTI from the RAN to the radio device. This is also referred to as asynchronous HARQ feedback.

Preferably, the HARQ feedback (e.g., a UL-grant) in the step 408 is sent according to the processing capability i of the UE. For example, after receiving a HARQ transmission at TTI n in the step 406, the RAN determines the next TTI n+k that is scheduled for grant-free UL transmission and associated with the proper HARQ PID. That is, the determined TTI n+k may be used for the step 410. The HARQ feedback is sent at the TTI n+k−i in the step 408, which enables the UE to use the next TTI for the HARQ retransmission in the step 410 within the processing capabilities of the UE.

Thus, the technique can be embodied to achieve the flexibility of asynchronous HARQ. The increase in latency caused by conventional asynchronous HARQ can be avoided. E.g., the RAN can configure the number of HARQ processes specifically for each radio device, so that the next TTI associated with the HARQ PID after the HARQ feedback transmission is also the earliest possible TTI given the processing capabilities of the radio device. Thus, the technique for handling the HARQ processes can be embodied without increasing signaling overhead (e.g. by TTI-implicit PIDs) and/or without increasing latency (e.g., by configuring the radio device-specific number of HARQ processes so as to minimize the round-trip-time).

Optionally, the HARQ retransmission may be adaptive (e.g., based on downlink control information, DCI). The HARQ retransmission may also be referred to as synchronous, since the retransmission occurs on TTIs associated to the same PID.

In addition, the technique is backward compatible with synchronous HARQ for LTE UL transmission. In LTE-Frequency Division Duplex (FDD), a HARQ process for the uplink transmission is synchronous, i.e., a specific PID number is used at each TTI or subframe scheduled for the grant-free transmission of the respective UE. In LTE, the UE uses the same HARQ process number every 8 TTIs. A HARQ retransmission of the data, if needed, with the same HARQ PID is received at the RAN every 8 TTIs. Since the UE uses a specific HARQ PID at each subframe (which corresponds to the TTI in conventional LTE), the RAN (e.g., the eNB) knows exactly which HARQ process comes when. This benefit is maintained by the present technique configuring UE-specific process intervals, since the RAN (e.g., the base station) has computed the number of HARQ processes, which is used as a control parameter for tuning the association between PID and TTI.

The technique may be applied in the context of LTE, e.g., in LTE Rel-14. The technique may use or enhance the semi-persistent scheduling (SPS) framework, e.g., for Instant Uplink Access (IUA) or Fast Uplink Access, which allow periodicities of one TTI, i.e., consecutive TTIs are persistently allocated to the radio device (and, thus, to a user).

Since the round-trip-time for the transmission feedback is typically larger than one TTI, multiple SPS HARQ processes are needed for channel efficiency. Since the HARQ PID is not expressly indicated per TTI, formulas for DL SPS and/or UL SPS define an association to derive the HARQ PID from the absolute system frame number (SFN) and subframe number or TTI within the system frame (which is known in both eNB and UE). For example, a conventional formula for deriving the HARQ PID based on the TTI in UL SPS according to 3GPP TS 36.321, Clause 5.4.1 (e.g., V14.2.1) may be modified, or applied in an unconventional way, by computing and signaling the number of HARQ processes configured for the UL SPS specifically for UE.

By way of example, the divisor for the modulo operation is UE-specific. The formula defining the association between TTIs and HARQ PIDs, i.e. for deriving the HARQ PID from the absolute SFN and subframe number (which is known in both eNB and UE due to cell synchronization) may read for short TTI (sTTI) and UL SPS:

HARQ Process ID=[floor(CURRENT_TTI/ (semiPersistSchedIntervalUL*SPS sTTI count in subframe))] modulo numberOfConfUISPS-Processes, where CURRENT_TTI=[(SFN*10*SPS sTTI count in subframe)+(subframe number*SPS sTTI count in subframe)+sTTI number] and it refers to the subframe where the first transmission of a bundle takes place.

Herein, the divisor in bold type is the computed number of HARQ processes.

In what follows, the technique is described in the context of UL SPS using sTTI. However, the skilled person will appreciate that the same principle are applicable in a system with pre-configured transmission grant and/or asynchronous HARQ feedback, such as a grant-free UL transmission with slots or mini-slots in 5G NR.

The configured SPS period (as an example for the grant-free scheduling interval) for the UE is p. E.g., based on the step 402, the configured or indicated processing timing (i.e. UL timing) at UE side is i. In the step 404, the RAN sets its required processing timing j according to current needs. In the step 202, the RAN then sets the number of configured UL SPS HARQ processes (i.e., numberOfConfUISPS-Processes), denoted hereby as M, according to:

$$M = \left\lceil \frac{i+j}{p} \right\rceil.$$

Here, i and j can be adjusted in order to find an integer M.

The parameter M, i.e., the "numberOfConfUISPS-Processes", is configured by RRC as one of the SPS parameters to the UE in the step 204.

During the HARQ operation, the initial UL transmission in the step 406 is at time n. According to the step 408, the network node then sends the HARQ feedback (i.e., UL-grant for retransmission) after processing the received HARQ transmission at time n+j. Optionally, the UL-grant is indicative of UL retransmission resources (e.g., in the frequency and/or spatial domain) for the time n+j+i, which is determined by the association formula. Both the network side and UE side use the association formula to derive the PID for each transmission with the configured "numberOfConfUISPS-Processes" according to the step 410.

Figure 5:
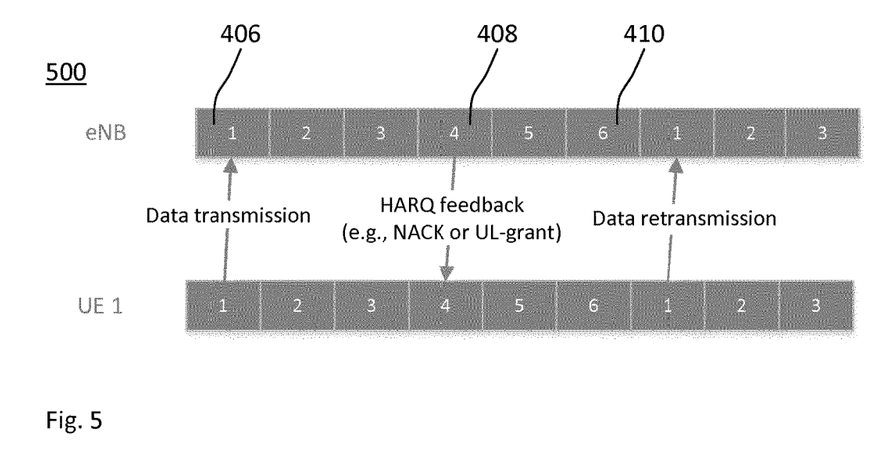
FIG. 5 shows a schematic first signaling diagram for a RAN including a device of FIG. 1.

FIG. 5 schematically illustrates a signaling diagram 500, which may result from performing any implementation of the method 200 in an example RAN. TTIs are represented by rectangles for each of an eNB at the RAN and a UE$_1$ as the radio device. Time grows from left to right. Numbers inside the rectangles indicate the HARQ PIDs according to the association between TTIs and PIDs. For simplicity, the grant-free scheduling interval p=1 TTI.

The example RAN requires j=3 TTIs for preparing and transmitting the HARQ feedback in the step 408 after receiving the HARQ transmission in the step 406. In the example illustrated in FIG. 5, the RAN is serving a UE$_1$ as the radio device with time duration i$_1$=3 for its HARQ processing resulting in the step 406, so that the computed number of HARQ processes for this UE$_1$ is M$_1$=6.

Figure 6:
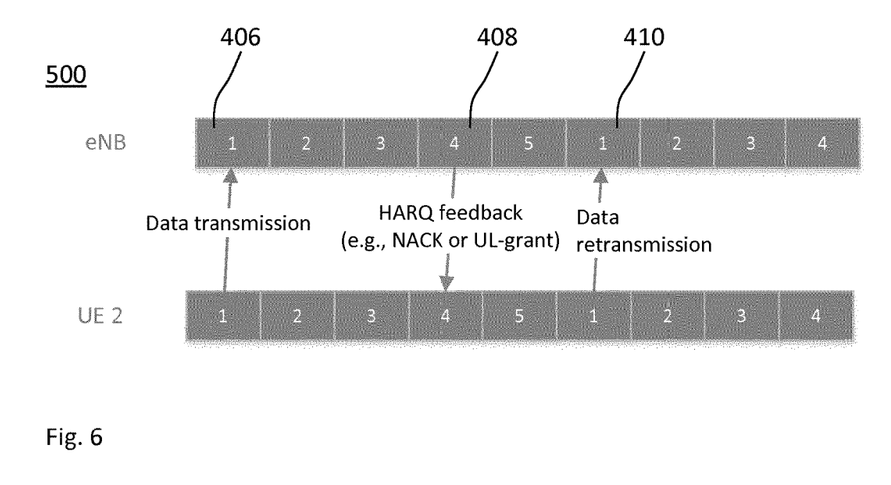
FIG. 6 shows a schematic second signaling diagram for a RAN including a device of FIG. 1.

FIG. 6 shows a schematic signaling diagram 500, which may result from performing any implementation of the method 200 in an example RAN with j=3 TTI and p=1 TTI. The RAN is serving a UE$_2$ with a time duration i$_2$=2 for HARQ processing, so that the computed number of HARQ processes for this UE$_2$ is M$_2$=5.

The same RAN, e.g., the same base station, may serve two or more radio devices with different time durations i for the HARQ processing at their side. E.g., the RAN may be in a RRC connected state with both the UE$_1$ and the UE$_2$ The method 200 may be performed upon configuring and/or enabling the grant-free transmission (e.g., the SPS) for the respective radio device.

Alternatively or in addition, the number of HARQ processes, M, may be dynamically configured (e.g., individually for each radio device). The processing time j at the RAN side can be changed. It may be greater than or equal to the fastest processing time the RAN side is capable of. The RAN may set in the step 202 (e.g., a repetition of the step 202) a greater processing time j to accommodate the current traffic load on the RAN and/or to allow some flexibilities in allocating subsequent retransmissions, e.g., by transmitting the NACK as a HARQ feedback by means of a UL scheduling grant.

The change of j is manifested by the dynamic configuration of the number of configured UL SPS processes M. The greater the M, the longer the processing time j and, consequently, the longer the latency.

If the network load is large (i.e., it is challenging for the serving base station to configure and allocate UL retransmission in a short time), the base station may configure a higher number of processes, M, for UE, which equivalently means that the processing time, j, at the base station is relaxed. If the network load is small, the base station may configure a smaller number of processes, M, for UE.

Suppose the network load can be summarized by, and/or abstracted as, a numerical value a. The number of processes M is then configured in the step 204 as an output of a function $f(a)$ (e.g., evaluated in the step 202). Different functions can be configured for services with different latency requirements. For a service with normal latency requirement, the function is $f_1(a)$. For service with low latency requirement, the function is defined as $f_2(a)$ such that for any a, $f_2(a)$ is smaller than $f_1(a)$. For a service with extreme low latency requirement, such as Ultra-Reliable Low Latency (URLLC), the output of the function $f(a)$ may be a constant value, e.g., corresponding to the smallest j value (i.e., the fastest processing time) that the serving base station is capable of.

Figure 7:
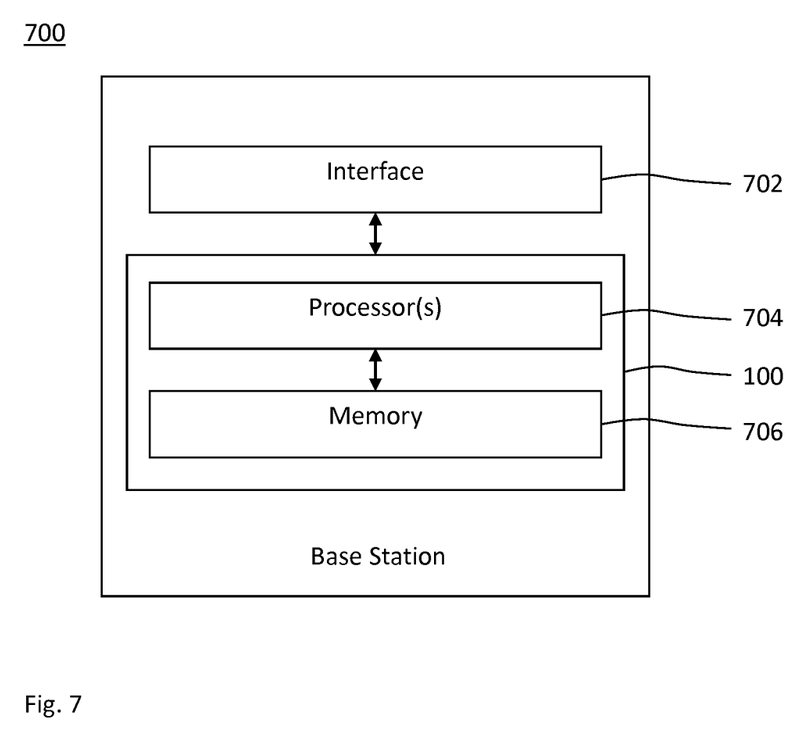
FIG. 7 shows a schematic block diagram of a first embodiment of the device of FIG. 1.

FIG. 7 shows a schematic block diagram for an embodiment of the device 100. The device 100 comprises one or more processors 704 for performing the method 200 and memory 706 coupled to the processors 704. For example, the memory 706 may be encoded with instructions that implement at least one of the modules 102 and 104.

The one or more processors 704 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 706, data receiver or RAN functionality. For example, the one or more processors 704 may execute instructions stored in the memory 706. Such functionality may include providing various features and steps discussed herein, including any of the benefits disclosed herein. The expression "the device being operative to perform an action" may denote the device 100 being configured to perform the action.

As schematically illustrated in FIG. 7, the device 100 may be embodied by a base station 700, e.g., of the RAN. The base station 600 comprises a radio interface 702 coupled to the device 100 for radio communication with one or more radio devices.

Figure 8:
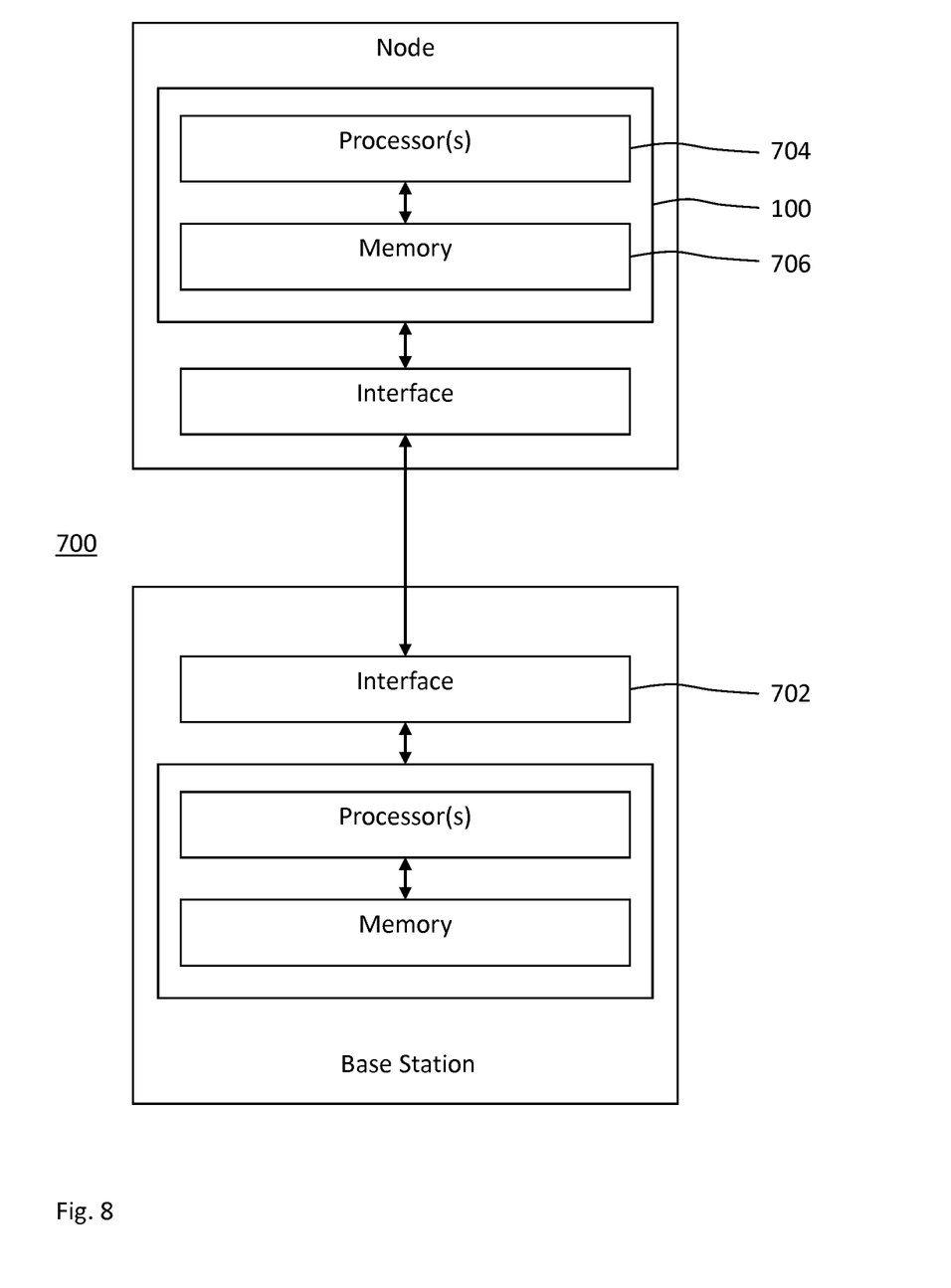
FIG. 8 shows a schematic block diagram of a second embodiment of the device of FIG. 1.

In a variant, e.g., as schematically illustrated in FIG. 8, the functionality of the device 100 is provided by a node of the RAN or a core network linked to the RAN. That is, the node performs the method 200. The functionality of the device 100 is provided by the node to the transmitting station 700, e.g., via the interface 702 or a dedicated wired or wireless interface.

As has become apparent from above description, embodiments of the technique enable different HARQ feedback timing within a cell accommodating UE capabilities with different processing timings. Same or further embodiments can obtain the flexibility of the asynchronous HARQ, e.g., for the low-latency service.

In addition, for LTE implementations, the technique may be compatible with existing 3GPP standards. For 5G NR implementations, the technique can avoid additional UL or DL control information.

Moreover, the technique may be implemented at a RAN such that the RAN schedules a UE for retransmission of a HARQ process in the appropriate transmit opportunity of said HARQ process, thus avoiding overwriting data in other HARQ processes.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of handling hybrid automatic repeat request (HARQ) processes for grant-free transmission in a radio access network (RAN), the method comprising:
computing, for a radio device configured or configurable for grant-free transmission in the RAN, a number of HARQ processes for the grant-free transmission of the radio device, wherein the computed number of HARQ processes is determined as a function of a processing delay at the UE, a processing delay at the network, and a grant-free scheduling interval and depends on the sum of the processing time for HARQ feedback at the base station and the processing time for performing a HARQ retransmission at the radio device;

scheduling transmission time intervals (TTIs) for the grant free transmission of the radio device, wherein the TTIs scheduled are associated with the HARQ processes depending on the number of HARQ processes computed for the radio device;

scheduling the TTIs at a process interval that depends on the number of HARQ processes computed for the radio device; and signaling, to the radio device, the computed number of HARQ processes.

2. The method of claim 1, wherein each of the HARQ processes for the grant-free transmission of the radio device is associated with a process identifier.

3. The method of claim 1, wherein the TTIs associated with one of the HARQ processes for the grant-free transmission of the radio device are scheduled at a process interval.

4. The method of claim 3, wherein all TTIs for the grant-free transmission of the radio device are scheduled at a grant-free scheduling interval.

5. The method of claim 4, wherein the process interval is an integer multiple of the grant-free scheduling interval.

6. The method of claim 4, wherein the process interval for the radio device is equal to the grant-free scheduling interval multiplied by the number of HARQ processes computed for the radio device.

7. The method of claim 3, wherein the process interval for the radio device is equal to or greater than a processing time for the HARQ process.

8. The method of claim 3, wherein the process interval for the radio device is equal to or greater than a processing time for analyzing a HARQ transmission received at the RAN, preparing a HARQ feedback at the RAN, and/or preparing a HARQ retransmission at the radio device.

9. The method of claim 1, wherein the number of HARQ processes for the grant-free transmission of the radio device is computed in accordance with the formula $$M=\text{ceil}((i+j)/p),$$

wherein i is a first time duration equal to or greater than a processing time at the radio device for performing a HARQ retransmission, j is a second time duration equal to or greater than a processing time at the RAN for transmitting a HARQ feedback, and p is a third time duration of the grant-free scheduling interval.

10. The method of claim 9, wherein the first time duration is configured by the RAN or indicated by the radio device.

11. The method of claim 9, wherein the second time duration is greater than a processing time at the RAN depending on a traffic load of the RAN.

12. The method of claim 1, further comprising receiving, from the radio device, a HARQ transmission or a HARQ retransmission in a transmission time interval (TTI) scheduled for the grant-free transmission of the radio device.

13. The method of claim 12, further comprising deriving, based on the TTI of the HARQ transmission or retransmission and the number of HARQ processes computed for the radio device, the HARQ process of the HARQ transmission or retransmission.

14. The method of claim 12, further comprising deriving the HARQ process of the HARQ transmission or retransmission based on the formula

[floor([the TTI of the HARQ transmission or retransmission]/[the grant-free scheduling interval in terms of TTIs])]modulo[the number of HARQ processes computed for the radio device].

15. The method of claim 12, further comprising transmitting, to the radio device, a HARQ feedback in response to the HARQ transmission or the HARQ retransmission.

16. The method of claim 15, wherein the HARQ feedback is transmitted in a time duration equal to or greater than a processing time at the radio device for performing a HARQ retransmission prior to a TTI associated with the HARQ process of the HARQ transmission or previous HARQ retransmission.

17. The method of claim 1:
wherein a base station or a cell of the RAN serves a plurality of radio devices; and
wherein the number of HARQ processes is at least one of computed for each of the radio devices and signaled to each of the radio devices.

18. A device for handling hybrid automatic repeat request (HARQ) processes for grant-free transmission in a radio access network (RAN) the device comprising:
processing circuitry;
memory containing instructions executable by the processing circuitry whereby the device is operative to:
compute, for a radio device configured or configurable for grant-free transmission in the RAN, a number of HARQ processes for the grant-free transmission of the radio device, wherein the computed number of HARQ processes is determined as a function of a processing delay at the UE, a processing delay at the network, and a grant-free scheduling interval and depends on the sum of the processing time for HARQ feedback at the base station and the processing time for performing a HARQ retransmission at the radio device;
schedule transmission time intervals (TTIs) for the grant free transmission of the radio device, wherein the TTIs scheduled are associated with the HARQ processes depending on the number of HARQ processes computed for the radio device;
schedule the TTIs at a process interval that depends on the number of HARQ processes computed for the radio device; and
signal, to the radio device, the computed number of HARQ processes.

\* \* \* \* \*